United States Patent [19]
Babinsky

[11] 4,112,149
[45] Sep. 5, 1978

[54] CONVERTING A DIAPHRAGM ELECTROLYTIC CELL TO A MEMBRANE ELECTROLYTIC CELL

[75] Inventor: Andrew D. Babinsky, Chagrin Falls, Ohio

[73] Assignee: Diamond Shamrock Corporation, Cleveland, Ohio

[21] Appl. No.: 790,756

[22] Filed: Apr. 25, 1977

Related U.S. Application Data

[63] Continuation-in-part of Ser. No. 688,842, May 21, 1976, Pat. No. 4,036,728.

[51] Int. Cl.$^2$ .................. C25B 11/03; C25B 13/08
[52] U.S. Cl. ................................ 427/34; 427/58; 427/115; 427/294; 427/372 A; 427/385 C; 427/392; 427/407 F; 204/282; 204/283; 204/296
[58] Field of Search ............... 204/283, 296, 282; 427/58, 34, 294, 407 F, 372 A, 385 C, 392

[56] References Cited

U.S. PATENT DOCUMENTS

| | | | |
|---|---|---|---|
| 3,923,630 | 12/1975 | Argade et al. | 204/283 |
| 3,928,166 | 12/1975 | O'Leary et al. | 204/282 |
| 3,944,477 | 3/1976 | Argade | 204/283 |
| 3,969,285 | 7/1976 | Grot | 204/296 |
| 3,980,613 | 9/1976 | Bachot et al. | 204/296 |
| 4,036,728 | 7/1977 | Babinsky | 204/283 |

FOREIGN PATENT DOCUMENTS 1,410,313  10/1975  United Kingdom .................... 204/283

Primary Examiner—Michael F. Esposito
Attorney, Agent, or Firm—Bruce M. Winchell

[57] ABSTRACT

Disclosed is a method for converting a diaphragm electrolytic cell to a membrane electrolytic cell by using the standard diaphragm cell equipment and applying a membrane over top of a matting material upon the cathode surface. This method permits a manufacturer having diaphragm electrolytic cells to convert those cells to membrane electrolytic cells without significant capital expenditure to achieve the desirable characteristics of a membrane electrolytic cell.

5 Claims, No Drawings

CONVERTING A DIAPHRAGM ELECTROLYTIC CELL TO A MEMBRANE ELECTROLYTIC CELL

CROSS REFERENCE TO RELATED APPLICATION

This application is a continuation-in-part of U.S. Pat. application Ser. No. 688,842 filed May 21, 1976 now U.S. Pat. No. 4,036,728.

BACKGROUND OF THE INVENTION

The present invention relates generally to the conversion of a standard diaphragm electrolytic cell which is being used for chlorine and caustic (sodium hydroxide) production, to an electrolytic cell having a membrane for the same type of chemical production with the inherent advantageous characteristics of a membrane electrolytic cell. More particularly the present invention relates to a method for forming a membrane over a standard diaphragm electrolytic cell cathode by vacuum forming a matting material onto the foraminous electrode and subsequently applying a membrane material over top of the matting material which is fused into a thin and uniform substantially hydraulically impermeable film. Such a method will allow manufacturers having standard diaphragm electrolytic cell equipment in current use to convert that equipment to membrane electrolytic cells with a smaller capital expenditure to yield a savings in the operational costs associated with the use of membrane electrolytic cells.

Electrochemical methods of manufacture are becoming ever increasingly important to the chemical industry due to their greater ecological acceptability, potential for energy conservation, and the resultant cost reductions possible. Therefore a great deal of research and development effort is being applied to the electrochemical processes and the hardware for these processes. From this effort has come technological advances such as the dimensionally stable anode and various coating compositions therefor which permit ever narrowing gaps between the electrodes, such that the electrolytic cell has become more efficient for use in electrochemical processes. Also the hydraulically impermeable membrane has added a great deal to the potential use of electrolytic cells in terms of the selective migration of various ions across the membrane surface so as to exclude contaminants from the resultant product thereby eliminating some costly purification and concentration steps of processing.

One significant commercial possibility for these advances in electrolytic cells would be in chlorine and caustic production. Chlorine and caustic are essential and large volume commodities which are basic chemicals required by all industrial societies. They are produced almost entirely electrolytically from aqueous solutions of alkali metal chlorides, with a major proportion of such production coming from diaphragm-type electrolytic cells. In the diaphragm cell process, brine (sodium chloride solution) is fed continuously into the anode compartment and flows through the diaphragm usually made of asbestos, backed by the cathode. To minimize back migraton of the hydroxide ions, the flow is always maintained in excess of the conversion rate so that the resulting catholyte solution has unused alkali metal chloride present. The hydrogen ions are discharged from the solution at the cathode in the form of molecular hydrogen gas. The cathode solution, containing caustic, unreacted sodium chlorde, and other impurities, generally has been concentrated and purified later to obtain a marketable sodium hydroxide commodity and a sodium chloride which can be reused in a chlorine and a caustic electrolytic cell for further production of sodium hydroxide.

The dimensionally stable anode is today being used by a large number of chlorine and caustic producers but the extensive commercial use of the hydraulically impermeable membrane has been at least in part militated against by the substantial capital cost involved in converting from disphragm electrolytic cells to membrance electrolytic cells. This is caused by the difficulty in placing a more or less planar membrane onto the cathode assembly which is generally a three dimensional assembly onto which the asbestos diaphragm is placed by vacuum forming from a slurry. The diaphragm has been improved by adding to the slurry from which the diaphragm is deposited onto the cathode assembly, a polymeric material to act as a binding substance so as to improve the chemical resistivities of the diaphragm material. This dimensionally stable polymer modified diaphragm though is not a hydraulically impermeable membrane. Another approach has been to form a membrane on the electrode surface itself. The probelm with this approach is that most of the cathode assemblies in current use are foraminous in nature and such porosity makes it very difficult to deposit membrane material to form a film directly onto the cathode assembly.

SUMMARY OF THE INVENTION

It is therefore an object of the present invention to provide a method for forming a membrane over a standard diaphragm cell electrode assembly so as to eliminate the substantial capital costs involved currently for converting a diaphragm electrolytic cell to a membrane electrolytic cell.

It is another object of the present invention to provide a method for forming a membrane over a standard diaphragm cell electrode assembly so that the advantages of a membrane may be realized by using existing diaphragm electrolytic cell equipment.

These and other objects of the present invention, together with the advantages thereof over existing and prior art forms which will become apparent to those skilled in the art from the detailed disclosure of the present invention as set forth hereinbelow, are accomplished by the improvements herein described and claimed.

It has been found that a method for forming a membrane over a standard diaphragm cell foraminous electrode can comprise the steps of: suspending a matting material in a liquid medium; inserting a foraminous electrode into the suspending; vacuum forming a layer of the suspended matting material over the surface of the foraminous electrode so as to substantially reduce the porosity of the foraminous electrode material; applying to the surface of the foraminous electrode with the matting material thereon a layer of thermoplastic material including NAFION particles in the sulfonyl fluoride form; baking the foraminous electrode with the layers in place until the thermoplastic material is fused into a thin and uniform film on the surface of the matting material which is substantially impermeable to hydraulic flow; and hydrolyzing the NAFION to change the sulfonyl fluoride form to the cation exchange sulfonic acid form.

It has also been found that a membrane separator for a standard diaphragm electrolytic cell can comprise: a standard diaphragm cell foraminous electrode; on the surface of the standard diaphragm cell foraminous electrode, a layer of matting material of such thickness as to substantially reduce the porosity of the standard diaphragm cell foraminous electrode; and on the surface of the matting material a thin and uniform hydraulically impermeable cation exchange membrane consisting essentially of a film of copolymers having the repeating structural units of the formula:

 (1)

and

—CF$_2$—CXX$^1$— (2)

wherein R represents the group

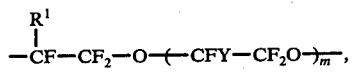

in which R$^1$ is fluorine or perfluoroalkyl of 1 to 10 carbon atoms; Y is fluorine or trifluoromethyl; $m$ is 1,2 or 3; $n$ is 0 or 1; X is fluorine, chlorine, or trifluoromethyl; X$^1$ is X or CF$_3$—(CF$_2$)$_a$—O—; $a$ is 0 or integer from 1 to 5; and the units of the formula (1) being present in an amount to provide a copolymer having a —SO$_3$H equivalent weight in the range of 800 to 1600.

A method for forming a membrane over a standard diaphragm cell foraminous electrode may comprise the steps of: suspending a matting material in a liquid medium; inserting a foraminous electrode into the suspension; vacuum forming a layer of suspended matting material over the surface of the foraminous electrode so as to substantially reduce the porosity of the foraminous electrode material; applying to the surface of the foraminous electrode with the matting material thereon a layer of thermoplastic material including material containing carboxyl ion exchange groups; and baking the foraminous electrode with the layers in place until the thermoplastic material is fused into a thin and uniform film on the surface of the matting material which is substantially impermeable to hydraulic flow.

A membrane separator for a standard diaphragm electrolytic cell can comprise: a standard diaphragm cell foraminous electrode; on the surface of the standard diaphragm cell foraminous electrode, a layer of matting material of such thickness as to substantially reduce the porosity of the standard diaphragm cell foraminous electrode; and on the surface of the matting material a thin and uniform hydraulically impermeable cation exchange membrane consisting essentially of a film of copolymers having the repeating structural units of the formula:

 (1)

—CF$_2$—CXX$^1$— (2)

wherein R represents the group

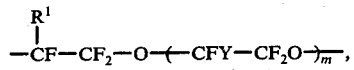

in which R$^1$ is fluorine or perfluoroalkyl of 1 to 10 carbon atoms; Y is fluorine or trifluoromethyl; $m$ is 1,2 or 3; $n$ is 0 or 1; X is fluorine, chlorine, or trifluoromethyl; X$^1$ is X or CF$_3$—(CF$_2$)$_a$—O—; $a$ is 0 or integer from 1 to 5; wherein R$^2$ is an ion exchange group selected from the group of oxy acids, salts or esters of carbon, nitrogen, silicon, phosphorous, sulfur, chlorine, arsenic, selenium or tellurium.

DESCRIPTION OF THE PREFERRED EMBODIMENTS

The membrane separator for a standard diaphragm electrolytic cell electrode assembly and the method for forming such a membrane will overcome many of the disadvantages of the prior art forms listed above and yield the benefits of the use of a membrane in an electrolytic cell without the substantial capital cost associated heretofore with the conversion of a diaphragm electrolytic cell to a membrane electrolytic cell. Most of these diaphragm electrolytic cells in use today are of two general types. Both consist of an outer steel shell either cylinderical or rectangular which supports a cathode of perforated iron plate or woven iron screen inside of the shell, generally referred to as a foraminous electrode element. This constitutes the cathode assembly. The actual cathode surfaces are generally lined with a layer of asbestos either in the form of paper wrapped around it or vacuum deposited fibers. The type of cathode assembly for which the present invention is especially useful is that known as the Diamond Shamrock Cell wherein the cathode assembly consists of a rectangular steel shell housing with an inner assembly of lateral rows of vertically flattened wire-screen tubes, upon which the diaphragm has been deposited by suction from a cell liquor suspension of asbestos fibers.

Since these foraminous electrode assemblies generally have a highly porosity it is necessary to reduce the porosity by vacuuming some type of matting material onto the foraminous electrode surface before applying a membrane material. The matting material may be an asbestos support made from chrysotile asbestos fibers mixed with 5% (by weight) fluorinated ethylene propylene copolymer particles, or any other material which will form a sufficient mat upon the foraminous electrode. Another example would be a cellulosic material. Alternatively, sheets of material such as filter paper could be wrapped around the electrode tube. It is believed that the exact nature of the matting material is not of great significance since it is generally of a temporary nature for the purpose of supporting the polymeric materials to form a film upon the foraminous electrode. It is believed that any depositable fiber will serve as an adequate support structure, inertness to chlorine cell environments not being necessary. Since the thickness of the support structure affects the cell potential it is desirable to obtain the thinnest matting structure consistent with the purpose of substantially reducing the porosity of the foraminous electrode material. One way of building a matting which is often used in industry is to suspend the matting material in a fluid medium and in the case of the asbestos fibers usually the cell liquor. The foraminous electrode material may then be suspended into the slurry of matting material and a vacuum pulled to the inside of the foraminous electrode material such that the fibers of the mating material will be drawn onto the surface of the foraminous electrode. This support structure will then provide a uniform surface on which the slurry of thermoplastic materials including NAFION can be applied. Once the thermoplastic material has been applied and fused, the support structure is no longer necessary and the film performs like a membrane. The matting structure itself must have a low enough porosity as to retain particles in the range of less than one micron on the surface without being pulled to the interior portions of the matting material.

The NAFION material being used in the present invention is a fluorinated copolymer having pendent sulfonic acid groups. The fluorinated copolymer is derived from monomers of the formula $$CF_2=CF+R+_n SO_2F \quad (1)$$

in which the pendent $-SO_2F$ groups are converted to $-SO_3H$ groups, and monomers of the formula $$CR_2=CXX^1 \quad (2)$$

where R represents the group $$-CF-CF_2-O+(-CFY-CF_2O+_m-,$$
$$\phantom{-CF-}|$$
$$\phantom{-CF-}R^1$$

in which $R^1$ is fluorine or per fluoroakyl of 1 thru 10 carbon atoms; Y is fluorine or rifluoromethyl; $m$ is 1, 2 or 3; $n$ is 0 or 1; X is fluorine, chlorine or trifluoromethyl; and $X^1$ is X or $CF_3+CF_2+_aO-$, wherein $a$ is 0 or an integer from 1 to 5.

This results in copolymers having two repeating structural units $$-CF_2-CF- \quad (3)$$
$$\phantom{-CF_2-}|$$
$$\phantom{-CF_2-}(R)_n$$
$$\phantom{-CF_2-}|$$
$$\phantom{-CF_2-}SO_3H$$

and $$-CF_2-CXX^1-. \quad (4)$$

In the copolymer there should be sufficient repeating units according to formula (3) above, to provide an $-SO_3H$ equivalent weight of about 800 to 1600. Materials having a water absorption rate of about 25 percent or greater are preferred since higher cell potentials at any given current density are required for materials having less water absorption. Similarly, materials having a film thickness (unlaminated) of about 8 mils or more require higher cell potentials resulting in a lower power efficiency.

Polymeric materials of this type are further described in the following patents which are hereby incorporated by reference: U.S. Pat. Nos. 3,041,317; 3,282,875; 3,560,568; 3,624,053; 3,718,627; and British Pat. No 1,184,321. Polymeric materials as aforedescribed are available frm E. I. duPont deNemours & Co. under the trademark NAFION.

Polymeric materials according to formulas 1 and 2 can also be made wherein the ion exchange group instead of being a sulfonic acid exchange group could be many other types of structures. One particular type of structure is a carboxyl group ending in either an acid, and ester or a salt to form an ion exchange group similar to that of the sulfonic acid. In such a group instead of having $SO_2F$ one would find $COOR^2$ in its place wherein $R^2$ may be selected from the group of hydrogen, an alkali metal ion or an organic radical. These polymeric materials are available presently from E. I. duPont deNemours & Co. Furthermore it has been found that a substrate material such as NAFION having any ion exchange group or function group capable of being converted into an ion exchange group or a function group in which an ion exchange group can easily be introduced would include such groups as oxy acids, salts, or esters of carbon, nitrogen, silicon, phosphorous, sulfer chlorine, arsenic, selenium, or tellurium.

The NAFION material along with any filler materials used may be applied by any method which will result in a thin uniform film as required above to form an adequate membrane over top of the deposited mating material. Among the methods thought to be suitable would be: deposition from a slurry, drawing the material onto the surface of the matting material with a vacuum, pouring the slurry over the matting material, brushing on a solution, or spraying in some fashion such as by a plasma spray. Vacuum forming from a slurry may be the most economical method since the equipment used for such a method would be the same as that used to apply the asbestos diaphragms.

A typical slurry for deposition upon a foraminous cathode with the mat in place can be made by using NAFION particulate material with a 1208 equivalent weight or 1073 equivalent weight mixed with a suitable solvent such as 1,1,2-trichlorotrifluoroethane which is available from E. I. duPont deNemours & Co. under the trademark FREON 113. FREON 113 works well because it softens the NAFION particles thus making it easier to reduce the particle size by shearing to yield a very uniform NAFION dispersion. It is also believed an aqueous slurry of NAFION with an alkylarylpolyether alcohol available from Diamond Shamrock Corp. under the trademark HYONIC PE260 used as a wetting agent would also perform well. The NAFION material is in the sulfonyl fluoride or thermoplastic form which unlike the sodium and acid forms is completely fusible into a polymeric film. A typical method for making such a suspension would be to utilize a stirrer fitted with a jacketed chamber and a reflux condenser into which NAFION particulate material is added along with FREON 113 solvent. The system is heated with hot water to boil the FREON 113 solvent and cold water is run through the reflux condenser to condense the FREON 113 solvent. Refluxing of the NAFION and FREON 113 mixture for approximately 10 minutes and then shearing for 30 minutes while continuing to reflux the FREON 113 solvent, produces a good NAFION slurry from which to deposit a film onto the matting material surface. Various thermoplastic materials compatible with NAFION may be used as fillers in the slurry to reduce the cost while producing a good film. Examples of such fillers would be a fluorinated ethylene propylene copolymer or a perfluoroalkoxy material.

The NAFION slurry may be applied to the support structure in various ways, the object being to produce a continuous uniform film after fusing. Subsequent to application the FREON 113 is allowed to evaporate and then the particulate material is fused into a film. This is accomplished by baking the entire foraminous electrode assembly in an oven generally at a temperature in the range of 240° to 300° C. More than one application and subsequent fusion of a thermoplastic material slurry may be necessary in order to produce hole free continuous film.

Once a thin and uniform film is formed on the surface of the matting material which is substantially impermeable to hydraulic flow, the film may then be hydrolyzed into the infusible ion exchange sulfonic acid form. Hydrolyzing or saponifying of the NAFION is a fairly simple procedure for the conversion of a sulfonyl fluoride form to the free acid form. This may be accomplished by soaking the film in a sodium hydroxide solution, sodium hydroxide in dimethyl sulfoxide solution, potassium hydroxide solution, or potassium hydroxide in dimethyl sulfoxide solution. Any of these treatments appear to work equally well although different temperatures and times are required to accomplish the hydrolysis. Once this has been accomplished, the electrode is then ready for use in a standard diaphragm electrolytic cell. The conditions of the cell should be altered to operate the cell as a membrane electrolytic cell.

Various means of improving these substrate materials have been sought, one of the most effective of which is the surface chemical treatment of the substrate itself. Generally these treatments consist of reacting the sulfonyl fluoride pendent groups with substances which will yield less polar bonding and thereby absorb fewer water molecules by hydrogen bonding. This has a tendency to narrow the pore openings through which the cations travel so that less water of hydration is transmitted with the cations through the membrane. An example of this would be to react the ethylene diamine with the pendent groups in the sulfonyl fluoride form to tie two of the pendent groups together by two nitrogen atoms in the ethylene diamine. Generally, in a film thickness of 7 mils, the surface treatment will be done to a depth of approximately 2 mils on one side of the film by controlling the time of reaction. This will result in good electrical conductivity and cation transmission with less hydroxide ion and associated water reverse migration.

The resultant membrane electrolytic cell will yield a high current density, a lower sodium chloride concentration in the resultant sodium hydroxide solution compared to a standard diaphragm cell, a higher resultat sodium hydroxide concentration, good utilization of existing cell space, longer lifetimes for the cell and a lower potential. Thus, those skilled in the art will recognize the advantages of the present invention to the chlorine and caustic industry.

In order that those skilled in the art may more readily understand the present invention and certain preferred aspects by which it may be practiced, the following specific examples are afforded.

EXAMPLE 1

For testing in a laboratory cell, a membrane was formed over an asbestos matting using a Buchner funnel as a framework structure over which to form the matting material. The matting material consisted of asbestos plus 5% fluorinated ethylene propylene copolymer as a binder in water to form a suspension. A vacuum was pulled on the Buchner funnel to draw the matting material onto the foraminous surface of the funnel until the porosity was reduced so as to capture particles in the size range of one micron. A thermoplastic material slurry was made from a 1208 equivalent weight NAFION resin particle material mixed with FREON 113 solvent (1,1,2-trichlorotrifluoroethane). The mixture was stirred at 47.8° C. to obtain a 10 gram slurry. The slurry was then filtered through the matting material overtop of the Buchner funnel. Fusion of the NAFION resin particles was accomplished by baking the matting material with the NAFION particles on the surface at a temperature of 300° C. for 60 minutes. This resulted in a thin and uniform film which was substantially impermeable to hydraulic flow. Thereafter the NAFION was hydrolyzed in a solution of dimethyl sulfoxide and water plus 10% sodium hydroxide at a temperature of 70° C. for a time period of 70 minutes to convert the sulfonyl fluoride form to the cation exchange sulfonic acid form.

This membrane over the matting material was then inserted into a laboratory test cell with a flow rate of 0.053 cc/min/sq.in. of cathode area, a head of 14 inches of brine, a potential of 4.29 volts and a current of 6.28 amperes at 92° C. to achieve a current efficiency of 64% over a period of 37 days.

EXAMPLE 2

An asbestos matting was formed over a Buchner funnel as described in Example 1. A thermoplastic material slurry was made utilizing a 1073 equivalent weight NAFION resin particle material in FREON 113 solvent (1,1,2-trichorotrifluoroethane) and refluxed at 5° C. for 10 minutes. The resultant slurry was then poured over the asbestos mat. After evaporation of the FREON 113, the NAFION resin particles were fused at a temperature of 275° C. for 30 minutes into a thin and uniform film. It was then hydrolyzed in 35% sodium hydroxide for one week.

The resultant membrane over the matting material was then inserted into a laboratory test cell under conditions according to Example 1 to achieve a miximum current efficiency of 50%.

EXAMPLE 3

An asbestos slurry was formed over a Buchner funnel according to Example 1. A slurry of thermoplastic material was made of 1073 equivalent weight NAFION resin particle material in FREON 113 solvent and refluxed according to Example 2. The slurry was then drawn onto the matting material with a 26 inch vacuum. The NAFION resin particles were fused at a temperature of 250° C. for 30 minutes, a second coat of the slurry was added by eye dropper to close holes in the film and a subsequent fusion was performed. The material was then hydrolyzed in dimethyl sulfoxide and sodium hydroxide at a temperature for 80° for 70 minutes.

The resultant membrane on the matting material was then inserted into a laboratory test cell under conditions according to Example 1 to achieve a 53% current efficiency for a period of 78 days.

EXAMPLE 4

A matting material was applied over a Buchner funnel and dried at 150° C. for 45 minutes as described in Example 1. A thermoplastic material slurry was made according to Example 1 and applied in a series of four coats the first two of which were brushed over the entire surface, the third and fourth were partial coatings to cover up holes. The film was fused at a temperature of 250° C. for 30 minutes and air tested for leaks after fusing each coat. The resultant film was then hydrolyzed in a solution of dimethyl sulfoxide and sodium hydroxide at a temperature of 80° C. for a period of 70 minutes.

The resultant membrane was then placed into a laboratory cell for testing under conditions according to Example 1 to achieve a current efficiency of approximately 60% for a time period of 67 days.

Thus it should be apparent from the foregoing description of the preferred embodiments that the method herein described accomplishes the objects of the invention and solves the problems attendant to conversion of diaphragm electrolytic cells to membrane electrolytic cells without the substantial capital costs associated with prior methods of conversion.

What is claimed is:

1. A method for forming a membrane over a standard diaphragm cell foraminous electrode comprising the steps of: suspending a matting material in a fluid medium; inserting a foraminous electrode into the suspension; vacuum forming a layer of the suspended matting material over the surface of the foraminous electrode so as to substantially reduce the porosity of the foraminous electrode material; applying to the surface of the foraminous electrode with the matting material thereon, a layer of thermoplastic material including material containing carboxyl ion exchange groups and baking the foraminous electrode with the layers in place until the thermoplastic material is fused into a thin and uniform film on the surface of the matting material which is substantially impermeable to hydraulic flow.

2. A method according to claim 1 wherein the thermoplastic material is applied by vacuum forming a slurry of thermoplastic material from a FREON 113 solvent.

3. A method according to claim 1 wherein the thermoplastic material is applied by plasma spray.

4. A method according to claim 1 wherein said baking step is done at a temperature within the range of 240° to 300° C.

5. A method according to claim 1 wherein the matting material is selected from the group of: asbestos or cellulose.

* * * * *